United States Patent [19]

Marshell

[11] Patent Number: 4,653,711
[45] Date of Patent: Mar. 31, 1987

[54] AUTOMOTIVE VEHICLE FUEL TANK CAP HANGER

[76] Inventor: Edward L. Marshell, 5317 Meadow Wood Ave., Lakewood, Calif. 90712

[21] Appl. No.: 800,755

[22] Filed: Nov. 22, 1985

[51] Int. Cl.$^4$ .............................................. F16B 47/00
[52] U.S. Cl. .................................. 248/205.3; 24/3 F; 24/563; 220/85 CH; 220/DIG. 33; 224/273; 248/315; 296/1 C
[58] Field of Search ............... 248/315, 102, 110, 111, 248/312, 309.1, 314, 205.3; 296/1 C; 280/152 A; 141/392, 379, 342; 224/273; 42.42; 24/3 E, 3 F, 3 R, 563, 16 PB; 220/85 CH, DIG. 33

[56] References Cited

U.S. PATENT DOCUMENTS

| 2,050,841 | 8/1936 | Houghton | 248/102 |
| 2,161,854 | 6/1939 | Copell | 248/315 |
| 2,221,801 | 11/1940 | Keppinger | 248/110 |
| 2,422,891 | 6/1947 | Dickson | 248/110 X |
| 2,460,963 | 2/1949 | Young | 24/563 X |
| 3,409,257 | 11/1968 | Elm | 248/205.3 X |
| 4,053,132 | 10/1977 | Del Pozzo | 248/235 |
| 4,141,452 | 2/1979 | Martin et al. | 248/309.1 X |
| 4,320,853 | 3/1982 | Moore | 220/DIG. 33 |

FOREIGN PATENT DOCUMENTS

| 508151 | 6/1953 | Belgium | 211/60.1 |
| 564719 | 2/1958 | Belgium | 248/111 |
| 2400757 | 7/1975 | Fed. Rep. of Germany | 296/1 C |
| 462813 | 4/1951 | Italy | 248/110 |
| 84421 | 7/1920 | Switzerland | 248/111 |

OTHER PUBLICATIONS

J. C. Whitney and Co., Catalog No. 448B, Stock No. 04 0366A, 7-1984.

Primary Examiner—J. Franklin Foss
Assistant Examiner—David L. Talbott
Attorney, Agent, or Firm—Charles H. Thomas

[57] ABSTRACT

A flat sheet of resilient material, such as rubber or plastic, is molded or cut to form a flat loop or ring encircling a central opening. A tensioning tab on one side of the loop projects into the opening toward the opposite side of the loop, and a retaining tab is mounted on a support which projects into the opening from the opposite side of the loop. The hanger has front and back surfaces, and the retaining tab projects outwardly away from the front surface of the loop. Adhesive on the back surface of the loop is used to support the hanger in a generally planar, vertical disposition on the vertical inside wall of a fuel tank access door in an automotive vehicle. When the access door is opened, the top of the loop may be resiliently folded downwardly away from the surface of the access door, and the neck of a fuel tank cap may be inserted into the central opening in the hanger. When the hanger is released the tensioning and retaining tabs grip the neck of the fuel tank cap and hold it on the fuel tank access door. Even if the user forgets to replace the cap, the cap is not lost, but remains attached to the fuel tank access door of the vehicle.

10 Claims, 4 Drawing Figures

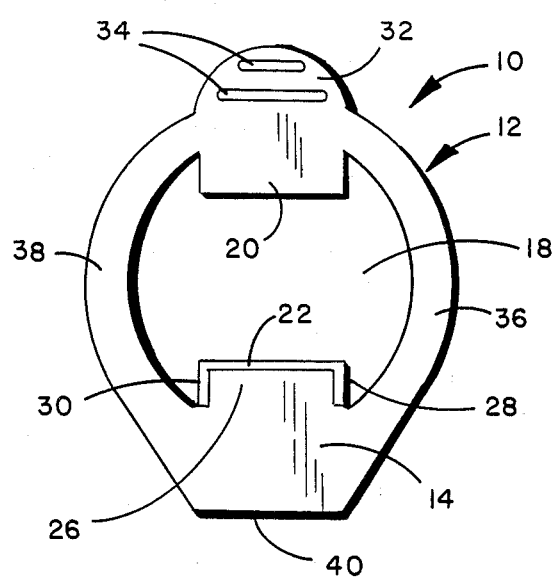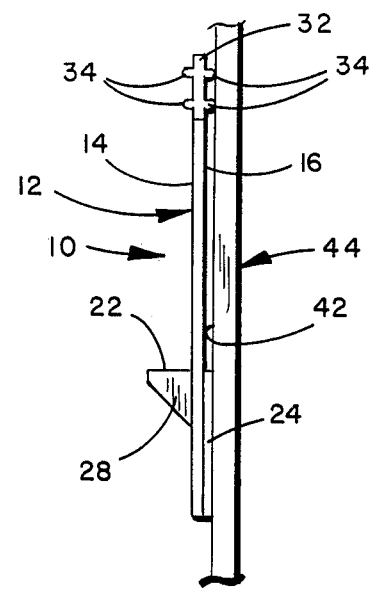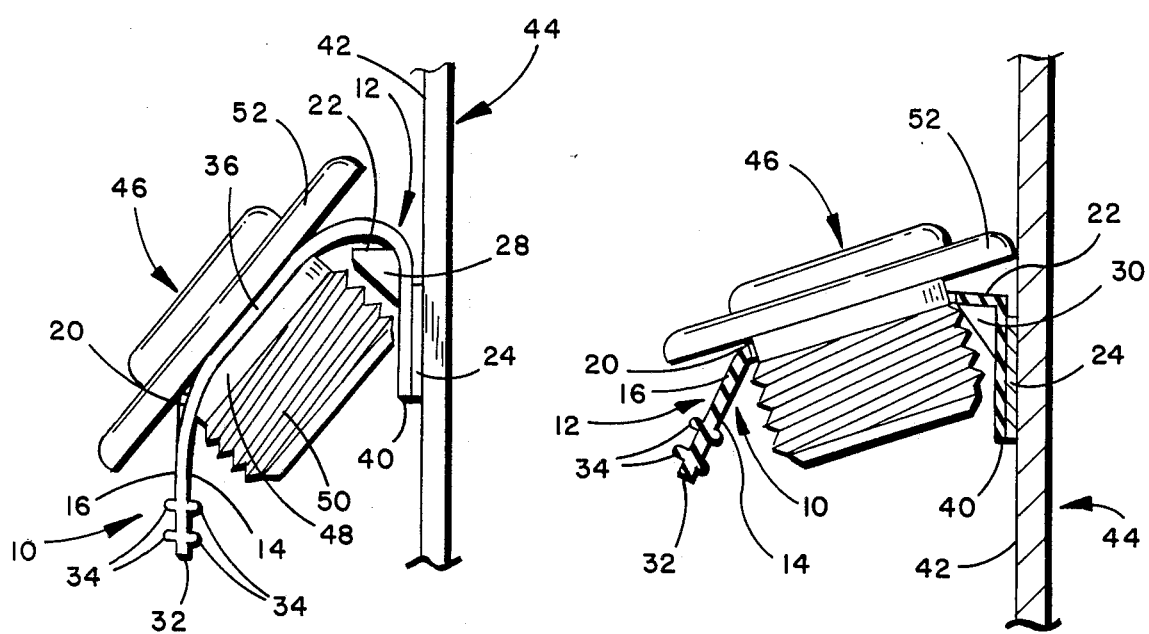

AUTOMOTIVE VEHICLE FUEL TANK CAP HANGER

BACKGROUND OF THE INVENTION

1. Field of the Invention

The present invention relates to a resilient hanger for an automotive vehicle fuel cap designed for attachment to the inside surface of a fuel tank filling inlet access door.

2. Description of the Prior Art

Most automobiles which are currently manufactured have fuel tank filling inlets located behind an access door in the side of the rear portion of the vehicle. A filling inlet access door is typically oriented in an upright, generally vertical disposition and is rotatably mounted on the vehicle body by a pair of hinges. A latch is usually provided on the door opposite the hinges, and normally requires a key in order for the access door to be opened.

Conventional vehicles include a variety of different fuel tank filling inlet cap configurations, but virtually all fuel tank filling inlet caps include some type of cam or thread mechanism whereby the cap is secured to close the filling inlet by means of a clockwise rotation relative thereto, and disengaged by counterclockwise rotation. Some fuel tank filling inlet caps employ a central hub which is externally threaded to cooperate with internal threads in the mouth of the filler inlet. Other types of filling inlet caps include a central hub with a pair of radially extending lugs that pass through radial cut-outs in the mouth of the filling inlet. The filling inlet mouth includes an interior ledge with a camming surface, so that the cap is pulled longitudinally into sealing engagement with the filling inlet mouth by the force of the lugs against the camming surface as the cap is rotated relative to the mouth. There are other configurations of fuel tank inlet caps, but nearly all such caps employ a central neck or hub which fits into the tank inlet mouth and is secured thereto by a rotational motion.

During refueling the fuel tank inlet cap must be removed so that the nozzle of a fuel hose may be inserted into the mouth of the filling inlet. Once the inlet cap is removed, the user normally places the cap on the hood or roof of the vehicle, or upon the housing for the fuel station pump. Not infrequently, the user forgets to replace the cap when refueling is completed. The cap then remains on the fuel station pump housing, or falls from the roof or hood of the vehicle as the vehicle is driven away. In either event the fuel cap is lost. This can lead to a dangerous condition with fuel spilling from the uncapped mouth of the tank inlet. At the very least, the owner of the vehicle must face the expense and inconvenience of replacing the filling inlet cap.

SUMMARY OF THE INVENTION

According to the present invention the fuel tank inlet access door is provided with a fuel tank cap hanger. The hanger is formed of a ring or loop of resilient material, typically cut or molded from a sheet of rubber or plastic. The ring or loop defines a central opening therewithin and an inwardly directed tensioning tab is located on one side of the ring or loop and projects into the central opening and toward an opposite side of the loop or ring. A retaining tab is located on the opposite side of the ring adjacent the opening. The hanger has front and back surfaces, and the retaining tab projects orthogonally outwardly away from the front surface of the loop. The back surface of the loop is normally carried in juxtaposition against the interior vertical wall of the fuel inlet access door. The hanger is mounted on this interior vertical surface by some means, such as adhesive, which secures the back surface of the loop or ring opposite the retaining tab against the vertical structure of the interior surface of the access door.

The central opening of the hanger is of a size and configuration which will readily receive the neck of virtually any fuel inlet cap which is commercially manufactured. For the fuel inlet cap neck to be inserted into the central opening the hanger is resiliently deformed by pulling the tensioning tab downwardly and outwardly, away from the surface of the fuel tank inlet access door. This causes the tensioning and retaining tabs to spread outwardly away form each other slightly so that the neck of a fuel inlet cap can be easily inserted into the central opening between the tabs. When the loop or ring is released, it attempts to return to its original, generally planar configuration. The sides of the loop serve as struts which resiliently grip the neck of the fuel tank cap inserted therebetween. The resilient action of the material of which the loop or ring is constructed causes the tabs to close against the structure of the filler inlet cap neck, and thereby hold the filler cap while fuel is pumped into the mouth of the fuel tank inlet. Following refueling, the hanger is again resiliently pulled so that the neck of the fuel inlet cap is released and the cap can again be engaged to close the mouth of the fuel inlet.

The use of a hanger according to the invention for a fuel inlet cap eliminates the possibility of losing the fuel inlet cap even if an individual forgets to replace the cap on the mouth of the fuel tank inlet following refueling. Should an individual absent mindedly forget to remove the cap from the hanger and replace it on the mouth of the fuel inlet, the cap still will be carried attached to the vehicle by the hanger at the interior surface of the fuel tank inlet door. Thus, the fuel tank cap is not lost and need not be replaced each time the owner of the vehicle forgets to re-engage it on the mouth of the fuel tank filling inlet.

A further advantage of the invention is the highly compact nature of the fuel tank cap hanger. The hanger normally resides flattened against the inside surface of a fuel tank inlet access door with only the retaining tab projecting out of the plane of the flat loop or ring which is available as a hanger for the fuel inlet cap. The structure of the hanger, therefore, easily fits within the cavity defined between the inner surface of the fuel tank inlet access door and the structure of the body of the vehicle surrounding the fuel tank inlet when the access door is closed. Furthermore, because the hanger is so flat and compact, it can be positioned in a number of different ways on the interior surface of the fuel inlet access door to conform to the configuration of the side of the vehicle and the latching mechanism employed to secure the access door.

The resilient loop or ring is preferably mounted in a generally vertical disposition with the tensioning tab directed downwardly toward the opposite side of the ring, and with the retaining tab directed outwardly from the front surface of the loop and away from the surface of the access door. The back surface of the loop is secured flat against the surface of the access door by any conventional fastening means, such as adhesive or adhesive tape. Any other conventional fastening mechanism may also be employed. For example, the loop can be equipped with a velcro pad and a mating velcro pad can be mounted on the interior surface of the access door. Alternatively, the hanger can be secured to the access door by means of screws, although such a manner of attachment would not be concealed from observation externally of the vehicle. Therefore, adhesive is the preferred means for securing the hanger to the interior surface of the access door.

The hanger of the invention is extremely economical to manufacture. Preferably, the hanger is formed by casting in a mold. The material employed to form the hanger is preferably rubber, although a resilient plastic, such as polyvinyl chloride, may also be employed.

The invention may be described with greater clarity and particularity by reference to the accompanying drawings.

DESCRIPTION OF THE DRAWINGS

FIG. 1 is a front elevational view of a hanger according to the invention against the surface of a filling inlet access door.

FIG. 2 is a side elevational view of the hanger of FIG. 1 in its undeformed condition.

FIG. 3 is a side elevational view showing the hanger of FIG. 2 deformed to admit the neck of a fuel tank cap in the central opening therein.

FIG. 4 is a side sectional view showing the manner in which the hanger functions to hold a fuel inlet cap.

DESCRIPTION OF THE EMBODIMENT

FIG. 1 illustrates an automotive vehicle fuel tank cap hanger or holder 10 which is formed of an oblong flat loop, ring or border 12 of resilient material, such as rubber. The ring 12 has front and back surfaces 14 and 16, respectively, as illustrated in FIG. 2. The ring 12 encircles a central opening indicated at 18 in FIG. 1 and includes a first tab 20 which serves as a tensioner tab. The tensioner tab is located on the top side of the ring 12, as viewed in FIG. 1, and projects into the opening 18. The tensioner tab 20 lies within the plane of the ring or border 12 and is directed radially inwardly toward the center of the opening 18, as illustrated. A second tab 22 is located on the opposite side of the ring or loop 12, diametrically opposite the tab 20 across the width of the opening 18. The tab 22 serves as a retainer tab, and projects orthogonally outwardly away from the front surface 14 of the ring 12. Unlike the tensioner tab 20, the retainer tab 22 extends orthogonal to the plane of the ring or border 12 in generally perpendicular alignment relative thereto. A rectangular patch of double sided adhesive tape 24 is provided on the back side 16 of the ring 12 directly behind, and proximate to the retainer tab 22.

The retainer tab 22 is disposed upon a mounting or support 26 located on the side of the ring 12 opposite the tensioner tab 20. The support 26 projects into the central opening 18 in the plane of the ring 12 toward the tensioner tab 20. The support 26 carries the retainer tab 22 at its free extremity. Preferably, the retainer tab 22 and the tensioner tab 20 are separated by a distance of no less than about one and one eighth inches. The use of an inwardly directly support 26, together with the spacing of the tensioner tab 20 and the retainer tab 22 apart a distance of one and one eighth inches allows the hanger 10 to accomodate virtually all threaded fuel tank caps, and also even the smallest commercially available cap which employs a central hub with diametrically opposed, radially projecting lugs. The tensioner tab 20 and the support 26 are of generally rectangular configuration and extend radially inwardly from opposite sides of the ring 12 to form indentations into an otherwise generally circular central opening 18. The retainer tab 22 extends generally perpendicular outwardly from the front surface of the ring 12, as do the braces 28 and 30.

The retainer tab 22 is stiffened by means of a pair of triangular shaped braces 28 and 30 which extend between the retainer tab 22 and the support 26. The use of braces 28 and 30 at the laterally opposite ends of the retainer tab 22 stiffens the retainer tab 22 so that it more effectively performs its function in holding the neck of a fuel tank cap inserted into the opening 18.

The annular ring 12 also includes a pull tab 32 of generally semi-circular configuration on its top side, as viewed in FIG. 1. The pull tab 32 projects in a direction opposite to and away from the tensioner tab 20. That is, the pull tab 32 is located on the same side of the flat loop or ring 12 as the tensioner tab 20, in coplanar relationship therewith. While the tab 20 is directed inwardly into the opening 18 encircled by the ring 12, the pull tab 32 extends in an opposite direction outwardly away from the central opening 18. The pull tab 32 has a pair of laterally extending raised ribs 34, projecting outwardly from the plane of the ring 12 from both the front surface 14 and the back surface 16 thereof. The ribs 34 provide the user with a firmer grip upon the pull tab 32 to operate the hanger 10 as will hereinafter be described.

The loop or ring 12, the tabs 20, 22 and 32, the braces 28 and 30, and the ribs 34 are preferably formed as a single, unitary, cast structure of rubber, polyvinyl chloride, or some other resilient material. Between the tabs 20 and 22 the ring 12 defines arcuate struts 36 and 38 on laterally opposite sides of the central opening 18. The bottom end 40 of the ring 12 is squared off to form corners with the struts 36 and 38.

In its undeformed state, the hanger 10 has the configuration depicted in FIG. 2. The adhesive strip 24 is located on the back surface 16 of the ring 12 behind the retainer tab 22. The adhesive strip 24 contains pressure sensitive adhesive on both of its opposite sides and is utilized to secure the hanger 10 to the interior surface 42 of a fuel tank inlet access door 44. The hanger 10 normally resides in the upright, generally planar configuration of FIG. 2 with the back surface 16 of the ring 12 facing the interior surface 42 of the access door 44. The hanger 10 thereby presents no storage problem and is easily housed within the cavity behind the access door 42, concealed from view when the access door 44 is closed.

When a fuel tank is to be filled, the fuel tank inlet cap, such as the cap 46 depicted in FIGS. 3 and 4, is removed from the fuel tank filling inlet mouth. The cap 46 has a central, axial neck 48, the lower portion of which bears male threads as indicated at 50. An annular sealing flange 52 extends radially outwardly relative to the axial neck 48.

When the fuel tank cap 46 is removed from the mouth of the fuel tank inlet, it may be conveniently placed in the hanger 10. To this end a user grips the pull tab 32 between the thumb and forefinger of one hand. A secue grip is enhanced by the ribs 34. Pulling the pull tab 32 downwarly, the user folds the ring 12 back upon itself in the manner depicted in FIG. 3. The pull tab 32 is short enough so there is little curvature between it and the tensioner tab 20. As the pull tab 32 is pulled downwardly, the tensioner tab 20 is moved into a generally vertical orientation, as depicted in FIG. 3. The fuel inlet cap 46 is then brought to the hanger 10, and the neck 48 thereof is inserted into the central opening 18. Using the tensioner tab 20 as a fulcrum, the fuel tank cap 46 is rocked slightly in a counterclockwise direction, as viewed in FIG. 3, so that the neck 48 of the cap 46 projects fully through the central opening 18 and completely beyond the back surface 16 of the ring 12. The pull tab 32 is then released.

Once released, the ring 12, being formed of resilient material, attempts to return to its original, undeformed condition depicted in FIG. 2. Since the bottom edge 40 of the ring 12 is secured to the access door 44, the pull tab 32 springs upwardly and in rotation until the edge of the sealing flange 52 of the fuel tank cap 46 abuts against the interior surface 42 of the access door 44. The neck 48 of the cap 46 is thereupon lightly gripped in the central opening 18 between the struts 36 and 38 and by the tensioner tab 20 and the retainer tab 22. The force exerted by the tabs 20 and 22 is sufficient to prevent the cap 46 from bouncing free from the hanger 10 should the user of the vehicle forget to replace the cap 46 in the mouth of the fuel tank inlet and drive the vehicle away. When the cap 46 is inserted into the hanger 10, the struts 36 and 38 are resiliently distended, and attempt to retract, thereby gripping the neck 48 of the cap 46 therebetween. Due to the gripping force exerted, the hanger 10 need not be mounted in a vertical orientation, as depicted in FIG. 2, but can be mounted horizontally or at any other angle in order to accomodate the configuration of the lock or hinges of the access door 44 or an obstruction from the body of the vehicle facing the interior surface 42 of the access door 44.

The hanger 10 will hold the fuel cap 46 in the position depicted in FIG. 4 until the user removes the cap 46 from the hanger 10. To remove the cap 46, the user merely pulls down on the pull tab 32, thus reorienting the pull tab 32 from the position of FIG. 4 to the position of FIG. 3. The cap 46 is then rotated counterclockwise, using the tensioner tab 20 as a fulcrum, thereby freeing the neck 48 from the central opening 18. The fuel inlet cap 46 is then threadably re-engaged with the mouth of the fuel tank inlet.

Undoubtedly, numerous variations and modifications of the invention will become readily apparent to those familiar with automotive vehicle fuel tank cap holding devices. For example, while the tensioner tab 20 and the retainer tab 22 in the embodiment described have been illustrated with flat edges facing each other, either or both of these tabs could be manufactured with curved, facing edges, or with any edge radius or configuration. Accordingly, the scope of the invention should not be construed as limited to the specific embodiment depicted and described, but rather is defined in the claims appended hereto.

I claim:

1. An automotive vehicle fuel tank cap hanger comprising a flat loop of resilient material having front and back surfaces and encircling a central opening, and including a tensioner tab on one side of said loop projecting into said opening toward the opposite side of said loop, a pull tab on said one side of said flat loop directed outwardly in a direction opposite from said tensioner tab and from said central opening, a retainer tab on said opposite side of said loop projecting outwardly away from said front surface of said loop, wherein said retainer tab and said tensioner tab are separated by a distance of no less than one and one eighth inches, and wherein said loop and said tabs are formed as a single, unitary, cast structure, and fastening means for securing said opposite side of said loop to a vertical support with said back surface of said loop juxtaposed against said vertical support.

2. A hanger according to claim 1 in which said pull tab has ribs thereon for gripping.

3. A hanger according to claim 1 wherein said fastening means is formed of a layer of adhesive on a portion of said back surface of said opposite side of said loop.

4. A hanger according to claim 1 further comprising a retainer tab mounting located on said opposite side of said loop and projecting into said central opening toward said tensioner tab and carrying said retainer tab at its extremity.

5. A fuel tank cap hanger comprised of a resilient ring having front and back surfaces and defining a central opening therewithin, an inwardly directed tensioning tab located on one side of said ring and projecting into said central opening and toward an opposite side of said ring, a pull tab projecting in a direction opposite to said tensioning tab on said one side of said ring, a retaining tab located on said opposite side of said ring and projecting orthogonally outwardly away from said front surface thereof, wherein said retaining tab and said tensioning tab are formed as a single, unitary cast structure and are separated from each other by a distance of no less than about one and one eighth inches, and means for securing said back surface of said ring oppposite said retaining tab against a vertical structure.

6. A hanger according to claim 5 further comprising a retaining tab support that projects from said opposite side of said ring toward said tensioning tab and carries said retaining tab at its free extremity.

7. A hanger according to claim 6 further comprising brace means disposed between said retaining tab and said support for stiffening said retaining tab.

8. A fuel tank cap holder for securement to a vertical surface comprising a sheet of resilient material having front and back surfaces and defining in its undeformed state a planar, annular border about a central opening and including a pair of diametrically opposed tabs on opposite sides of said opening, and a first of said tabs lies within the plane of said border and is directed radially inwardly toward the center of said opening and the second of said tabs is located diametrically opposite said first tab across said opening and extends orthogonal to the plane of said border outwardly away from said surface of said material, a pull tab defined on said border proximate to said first of said tabs and projecting outwardly away from said first of said tabs in a direction away from said central opening, and means for securing said border to a vertical support located proximate to said second of said tabs, so that said back surface of said material faces said vertical support, whereby said first tab may be pulled away from said vertical support to resiliently deform said border into a curved structure so that said central opening readily receives the neck of a fuel tank cap, and when said border is released with the neck of a fuel tank cap inserted into said central opening, the resiliency of said material causes said tabs to grip said neck of said fuel tank cap.

9. A fuel tank cap holder according to claim 8 further comprising a support projecting into said opening from said border in coplanar relationship with said first of said tabs when said material is in an undeformed condition, and said support carries said second of said tabs at its extremity.

10. A fuel tank cap holder according to claim 9 further comprising a pair of braces at opposite ends of said second of said tabs and interposed between said second of said tabs and said support.

* * * * *